United States Patent Office 3,751,564
Patented Aug. 7, 1973

3,751,564
PROCESS FOR PREPARING SCLEROPROTEIN-ALKYL THIOSULFATE AGENTS FOR THE CARE OF THE HAIR
Wolfgang Eckardt, Bad Segeberg, Rudolf Tietjf, Hamburg, and Victor Wolf, Hamburg-Blankenese, Germany, assignors to Lever Brothers Company, New York, N.Y.
No Drawing. Continuation of abandoned application Ser. No. 781,237, Dec. 4, 1968. This application Mar. 5, 1971, Ser. No. 121,571
Claims priority, application Germany, Dec. 8, 1967, P 16 95 969.6
Int. Cl. A61k 7/06, 7/08
U.S. Cl. 424—70     7 Claims

ABSTRACT OF THE DISCLOSURE

Process for the preparation of an anti-dandruff agent in which a partially degraded scleroprotein or fibrous protein is reacted with an alkyl or alkenyl thiosulphate in an aqueous alkaline medium.

This is a continuation of application Ser. No. 781,237 filed Dec. 4, 1968, and now abandoned.

The present invention relates to processes for the preparation of agents for the care of the hair, and in particular anti-dandruff agents. The invention further relates to anti-dandruff agents prepared by such processes and to hair care products containing such anti-dandruff agents.

According to the invention there is provided a process for the preparation of an anti-dandruff agent in which a partially degraded scleroprotein or fibrous protein is reacted with an alkyl or alkenyl thiosulphate in an aqueous alkaline medium. The reaction product is a complex formed between the degraded protein and the organic thiosulphate.

It is preferred that the pH of the aqueous alkaline medium is about 8 to 10 in which range a satisfactory rate of reaction is obtained and the protein degradation product and organic thiosulphate are most stable. The alkaline medium preferably employed is an aqueous ammonia solution.

Preferably the organic residue of the thiosulphate is an unsubstituted alkyl or alkenyl group having 6 to 18 carbon atoms. Examples of the organic thiosulphate employed in the process of the invention are the alkali metal and alkaline-earth metal salts of hexyl, octyl, lauryl, stearyl and undecenyl thiosulphate. Although the solubility of the organic thiosulphates in water decreases as the chain length of the organic residue increases, thiosulphates with an organic residue containing, for example, 18 carbon atoms are sufficiently soluble in water at elevated temperatures, for instance 50 to 60° C. Mixtures of organic thiosulphates may be used.

The reaction is preferably carried out at not more than about 80° C., above which temperature the protein-thiosulphate-complex reaction product is not very stable. Preferred reaction temperatures are in the range about 40 to 80° C. since at lower temperatures relatively long reaction times may be necessary.

The time required for the reaction will, as indicated, depend on the temperature at which the reaction is carried out, but reaction times longer than 15 minutes will generally be required. A reaction period of about 2 hours has been found quite satisfactory when carrying out the process at a temperature of 45° C. At 20° C. reaction times of more than 16 hours may be necessary.

Since rather low yields of the degraded protein-organic thiosulphate complex are obtained when using a weight ratio of the organic thiosulphate to the degraded protein of less than 0.4:1, the use of ratios higher than this is recommended. Preferred ratios are in the range 0.4:1 to 2:1, amounts in excess of this range being generally not more advantageous.

After the reaction, any undissolved material can be removed by filtration. Excess organic thiosulphate salt and low molecular weight degraded protein material can be removed by dialysis, preferably against de-mineralised or distilled water. The solution of the degraded protein-organic thiosulphate-complex obtained by the process of the invention may be used as such, or after partial or complete evaporation.

The partially degraded scleroproteins or fibrous proteins used in the process of the invention should have an average molecular weight of from 6,000 to 20,000. Suitable proteins of this type are, for instance, partially degraded keratin and silk fibroin, preferred protein materials being partially degraded horn keratin and pigs' bristles. The degradation of the raw protein material can be effected by generally known methods such as by treatment with concentrated acid or enzymes or both.

The anti-dandruff agent prepared in accordance with the invention can be included in a variety of hair care products. Such hair care products may, for example, be simply in the form of an aqueous or aqueous alcoholic anti-dandruff lotion or the anti-dandruff agent may be included in hair grooming preparations such as water-based hairdressings in liquid, cream or gel form, as well as in shampoos, hair setting lotions, hair conditioners and hair strengtheners.

The amount of the anti-dandruff agent prepared in accordance with the invention included in hair care products will vary depending on the nature of the product. For most forms of product the amount of the active agent will be in the range of 0.1 to 2.5% by weight of the hair preparation. For example, clinical tests have shown that simple aqueous solutions of the active ingredient, in a concentration of 0.5%, 0.37% and 0.25% by weight are effective anti-dandruff lotions. In the case of a shampoo, higher concentrations are recommended such as in the range 2.5 to 15% by weight; for instance levels of 5% and 10% in a shampoo have been shown to be effective against dandruff in clinical trials.

Hair care products in accordance with the invention as well as being alkaline can also be neutral or acid in character.

The invention will now be illustrated by the following examples of which Examples 1 to 3 and 7 illustrate the process of preparation of the anti-dandruff agent of the invention and Examples 4 to 6 are illustrative forms of hair care products containing the active agent. In Examples 4 to 6 percentages are by weight.

EXAMPLE 1

100 g. ground horn chips were extracted in a Soxhlet apparatus for about 72 hours with a mixture of equal parts of ethanol and methylene chloride as described by Janistyn, "Riechstoffe, Seifen, Kosmetika," 1950, Volume 1, page 226, and subsequently washed with ethanol at about 60° C. and finally with de-mineralised water at 60° C. While still damp and swollen, the horn chips were then treated with a solution of 4 g. pepsin and 10 g. concentrated hydrochloric acid in 1,886 ml. de-mineralised water for 8 hours at a temperature of about 40° C. After cooling and being left to stand for several hours, the horn chips were filtered off, washed with de-mineralised water until all the acid had been removed and finally dried in vacuo.

The dried chips were then boiled in a reflux condenser in 1,500 ml. acetic acid, stirring continuously, for 30 hours. After cooling, the undissolved matter was separated off and the clear acetic acid solution was evaporated to dryness. The residue was dried in vacuo and then pulverised. The yield was 81.8 g., the sulphur content 2.07%.

6.4 g. of the partial degradation product of keratin prepared as described above were stirred for two hours with 8 g. of sodium lauryl thiosulphate in 100 ml. of water, adjusted to pH 9 with ammonia solution, at 45° C. After cooling, undissolved matter was separated off. The clear solution was dialysed against water and the solution remaining after the dialysis evaporated in vacuo at 40° C.

The residue after evaporation was 7 g. of a yellowish powder with a sulphur content of 8.43%.

An approximately 3% aqueous solution of the powder acidified with acetic acid began to separate at a pH of 3.

EXAMPLE 2

10 g. of pure natural silk were treated at room temperature with 30 ml. concentrated hydrochloric acid, shaking occasionally, for about half an hour. 100 ml. water were then added and the reaction mixture was left to stand for 16 hours and was finally adjusted to a pH of 3 with 10% caustic soda solution. The residue was filtered off, washed twice with water, using each time 100 ml., and once with 100 ml. of a 5% solution of hydrochloric acid, and then dried over caustic soda.

The dried product was dissolved in aqueous ammonia. The solution was filtered through a strongly basic ion exchanger and the chloride-free filtrate was evaporated in vacuo at 40° C. until dry.

1.4 g. of the alkali-soluble silk fibroin degradation product prepared as described above were stirred for two hours with 1.75 g. of sodium lauryl thiosulphate in 20 ml. of aqueous ammonia solution of pH 9 at 45° C. After cooling, the solution was filtered to remove undissolved matter and evaporated in vacuo at 40° C. until dry. The residue was 1.5 g. of a white powder readily soluble in water, with a sulphur content of 7.91%.

An approximately 3% aqueous solution of the powder acidified with acetic acid began to separate at a pH of 3.6.

EXAMPLE 3

6 g. of the partial degradation product of keratin prepared as described in Example 1 were stirred for 2 hours with 4.5 g. of 10-undecenyl-1-thiosulphate in 150 ml. of aqueous ammonia with a pH of 9 at 45° C. After cooling, the solution was separated from undissolved matter, dialysed against de-mineralized water, and the solution remaining after the dialysis was evaporated in vacuo at 40° C. until dry.

The residue was 6.2 g. of a yellowish-brown powder with a sulphur content of 7.45%.

An approximately 3% aqueous solution of this powder acidified with acetic acid began to separate at a pH of about 3.6.

The yellowish to brownish powders obtained according to the above examples as residue after evaporation are soluble in an aqueous medium, and not only in an alkaline range but also in a neutral and even an acid range down to a pH value of between 3 and 4. Separation only starts at pH values of less than 3 to 4. In contrast to this, partial keratin hydrolysates and other partially degraded proteins which have not been reacted with organic thiosulphates are only soluble in the higher alkaline range. In most cases separation starts at pH values anything under 9.

EXAMPLE 4

The following is an example of anti-dandruff lotion.

| | Percent |
|---|---|
| Sodium lauryl thiosulphate-keratin complex | 0.5 |
| Ethanol | 20.0 |
| Perfume | 0.1 |
| Water | To 100.0 |

The mixture had a pH value of 6.5.

EXAMPLE 5

The following is an example of an anti-dandruff shampoo.

| | Percent |
|---|---|
| Sodium lauryl thiosulphate-keratin complex | 5.0 |
| Monoethanolamine lauryl sulphate | 10.5 |
| Lauric isopropanolamide | 1.5 |
| Formalin | 0.075 |
| Perfume | 0.4 |
| Water | To 100.0 |

The product had a pH value of 8.

EXAMPLE 6

The following is a further example of an anti-dandruff shampoo.

| | Percent |
|---|---|
| Sodium lauryl thiosulphate-keratin complex | 5.0 |
| Lauryl ether sulphate | 18.0 |
| Lauric acid monoethanolamide | 3.0 |
| Ethylene glycol distearate | 2.0 |
| Stearic acid | 5.0 |
| Zinc sulphate | 2.0 |
| Formalin | 0.1 |
| Perfume | 0.5 |
| Water | To 100.0 |

The pH of the shampoo was adjusted to 6.1.

In sensitisation tests carried out using sodium lauryl thiosulphate-keratin complex this material did not produce any skin sensitising effects.

Improved conditioning and manageability of the hair have been observed following the use of shampoos containing the active substance. The active substance also has surface-active properties.

EXAMPLE 7

The following is a further example of the process of preparation of the anti-dandruff agent of the invention and uses as keratin raw material pigs' bristles.

5 kg. of purified pigs' bristles were comminuted and without further treatment refluxed for 30 hours with 20 kg. of commercial acetic acid (98–99%). 8 kg. of the acetic acid were removed by distillation and the residue, which was still liquid, was stirred with 20 litres of ethyl acetate. The partially degraded keratin product thereby precipitated was washed with 10 litres of ethyl acetate until free of acid and then washed a further three times using each time 40 litres of water. The precipitate was then dried to a light brown product in a fluidised bed drying cabinet at 60° C. and ground with a powder in a ball mill. The yield was about 2.8 kg. (Analysis: S=5%, N=14%, amino-N=0.01%.)

2 kg. of the partially degraded keratin product prepared as above described were stirred for 2 hours with 0.8 kg. of sodium lauryl thiosulphate in 15 litres of water, adjusted to pH 9 with aqueous ammonia solution, at 45° C. The mixture was allowed to cool to room temperature, insoluble matter (unconverted keratin and excess sodium lauryl thiosulphate) removed by centrifuging and the solution spray-dried (air inlet temperature: 130° C.; air outlet temperature: 65° C.). The yield was 2.1 kg. (Analysis: S=7–10%, Na=1.5%, N=10–12%.)

We claim:
1. A process for alleviating dandruff which comprises contacting hair with a composition containing an effective amount of a soluble complex formed by reacting a partially degraded protein having an average molecular weight of from 6,000 to 20,000 and an alkyl or alkenyl thiosulphate in the presence of an aqueous alkaline medium; said partially degraded protein having been prepared by treating a scleroprotein or fibrous protein with concentrated acid or enzyme.

2. The process according to claim 1 in which the pH of the alkaline medium is about 8 to 10.

3. The process according to claim 1 in which the organic residue of the thiosulphate is selected from the group consisting of alkyl and alkenyl radicals having 6 to 18 carbon atoms.

4. The process according to claim 1 in which the reaction is carried out at a temperature of about 40° to 80° C.

5. The process according to claim 1 in which the weight ratio of the organic thiosulphate to the degraded protein material is about 0.4:1 to about 2:1.

6. The process according to claim 1 in which the organic thiosulphate is sodium lauryl thiosulphate.

7. The process according to claim 1 in which the protein material is selected from the group consisting of horn keratin and pigs' bristles.

References Cited
UNITED STATES PATENTS

| | | | |
|---|---|---|---|
| 2,261,094 | 10/1941 | Speakman | 132—7 |
| 2,615,782 | 10/1952 | Haefele | 260—123.7 X |
| 2,615,783 | 10/1952 | Haefele et al. | 424—71 X |
| 3,644,615 | 2/1972 | Salzberg et al. | 424—70 |
| 3,683,939 | 8/1972 | Johnson et al. | 424—70 |

OTHER REFERENCES

Chem. Abstracts, vol. 56, 1962, pp. 6087i–6088a–b, Schoeberl et al.

HOWARD E. SCHAIN, Primary Examiner

U.S. Cl. X.R.

260—123.7; 424—72.